US011906307B2

(12) United States Patent
Yamamoto et al.

(10) Patent No.: US 11,906,307 B2
(45) Date of Patent: Feb. 20, 2024

(54) CORRECTION METHOD FOR GYRO SENSOR

(71) Applicant: AICHI STEEL CORPORATION, Tokai (JP)

(72) Inventors: Michiharu Yamamoto, Tokai (JP); Kazuo Urakawa, Tokai (JP); Kota Aratani, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 373 days.

(21) Appl. No.: 17/417,408

(22) PCT Filed: Dec. 27, 2019

(86) PCT No.: PCT/JP2019/051546
§ 371 (c)(1),
(2) Date: Jun. 23, 2021

(87) PCT Pub. No.: WO2020/138470
PCT Pub. Date: Jul. 2, 2020

(65) Prior Publication Data
US 2022/0074745 A1 Mar. 10, 2022

(30) Foreign Application Priority Data

Dec. 28, 2018 (JP) ................................. 2018-248445
Mar. 1, 2019 (JP) ................................. 2019-037864

(51) Int. Cl.
*G01C 19/5776* (2012.01)
*G01C 21/28* (2006.01)
(Continued)

(52) U.S. Cl.
CPC ....... *G01C 19/5776* (2013.01); *B62D 15/025* (2013.01); *G01C 21/28* (2013.01);
(Continued)

(58) Field of Classification Search
None
See application file for complete search history.

(56) References Cited

U.S. PATENT DOCUMENTS 6,268,825 B1 * 7/2001 Okada ..................... B60T 8/172
701/454
11,119,499 B2 * 9/2021 Yamamoto ............. G08G 1/042
(Continued)

FOREIGN PATENT DOCUMENTS

DE   102018000599 A1   8/2018
JP     S63241609 A    10/1988
(Continued)

OTHER PUBLICATIONS

Extended European Search Report dated Aug. 30, 2022 for corresponding European Application No. 19903290.5.
(Continued)

*Primary Examiner* — Kristina M Deherrera
*Assistant Examiner* — Mark A Shabman
(74) *Attorney, Agent, or Firm* — Renner, Otto, Boisselle & Sklar, LLP

(57) ABSTRACT

A correction method for a gyro sensor which measures angular velocity of a vehicle about an axis in a vertical direction includes a generation process of performing a process on a difference between a measured azimuth obtained by performing a process on an sensor output, which is an output from the gyro sensor, and a vehicle azimuth estimated by using markers arranged along a traveling road of the vehicle to obtain correction information and a correction process of correcting the measured azimuth obtained by performing the process on the sensor output, which is the output from the gyro sensor, by using the correction information.

12 Claims, 15 Drawing Sheets

(51) Int. Cl.

| | | |
|---|---|---|
| *G08G 1/01* | (2006.01) | |
| *G08G 1/09* | (2006.01) | |
| *B62D 15/02* | (2006.01) | |
| *G05D 1/02* | (2020.01) | |
| *G05D 1/00* | (2006.01) | |

(52) U.S. Cl.
CPC ........... *G05D 1/027* (2013.01); *G05D 1/0261* (2013.01); *G08G 1/0116* (2013.01); *G08G 1/094* (2013.01); *G05D 2201/0213* (2013.01)

(56) References Cited

U.S. PATENT DOCUMENTS

| | | | |
|---|---|---|---|
| 2016/0238395 A1 | 8/2016 | Boukallel et al. | |
| 2018/0188029 A1* | 7/2018 | Oka | G01C 21/265 |
| 2020/0072617 A1* | 3/2020 | Tanaka | G01C 21/1652 |
| 2020/0133299 A1* | 4/2020 | Yamamoto | G01C 21/165 |
| 2020/0257304 A1* | 8/2020 | Moshchuk | G05D 1/0278 |
| 2020/0284586 A1* | 9/2020 | Yamamoto | G08G 1/163 |
| 2020/0372263 A1* | 11/2020 | Song | G05D 1/0251 |

FOREIGN PATENT DOCUMENTS

| | | |
|---|---|---|
| JP | 10-103983 A | 6/1998 |
| JP | 10-160493 A | 6/1998 |
| JP | 2016-91412 A | 5/2016 |

OTHER PUBLICATIONS

International Search Report for corresponding Application No. PCT/JP2019/051546, dated Mar. 24, 2020.

\* cited by examiner

[FIG. 1]
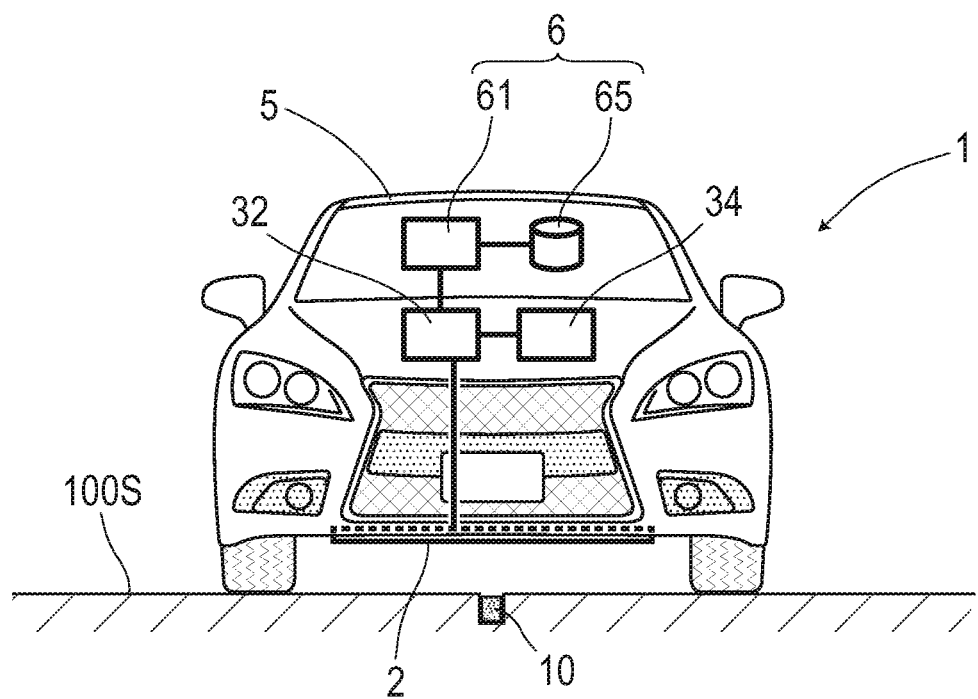

[FIG. 2]
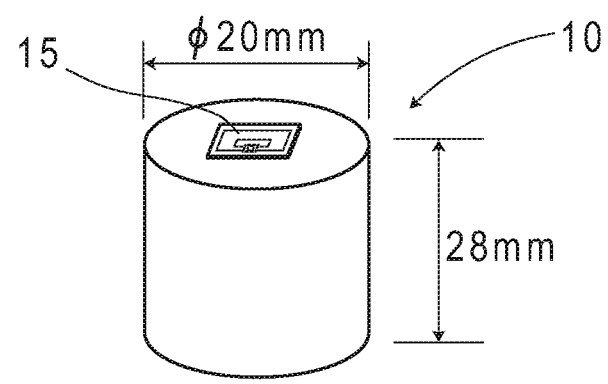

[FIG. 3]
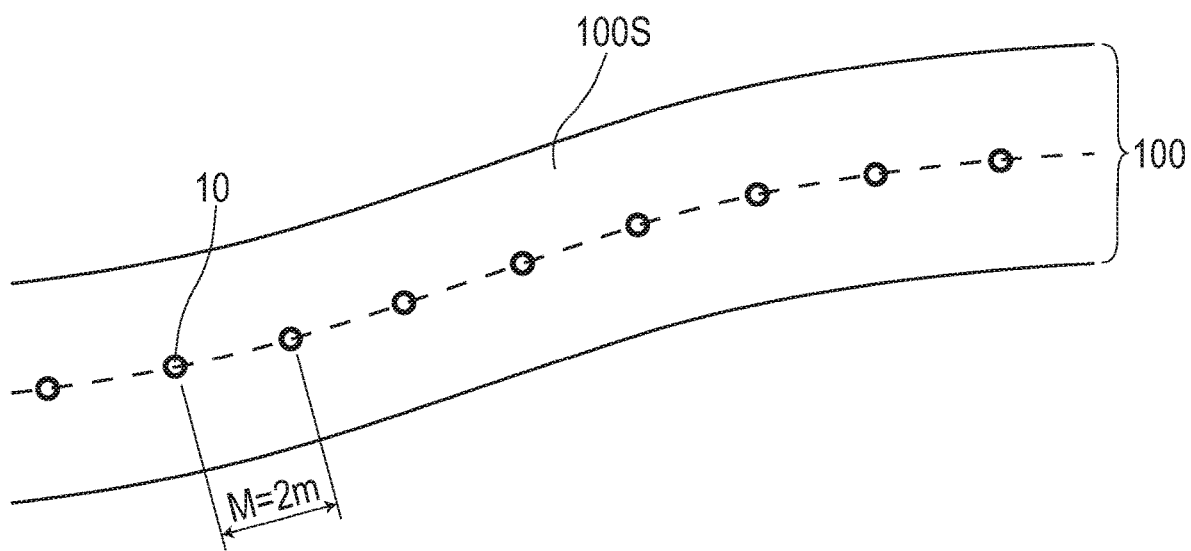

[FIG. 4]
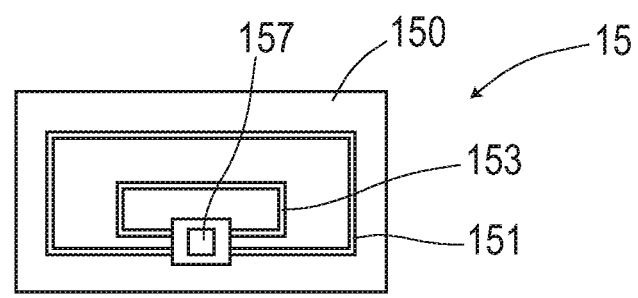

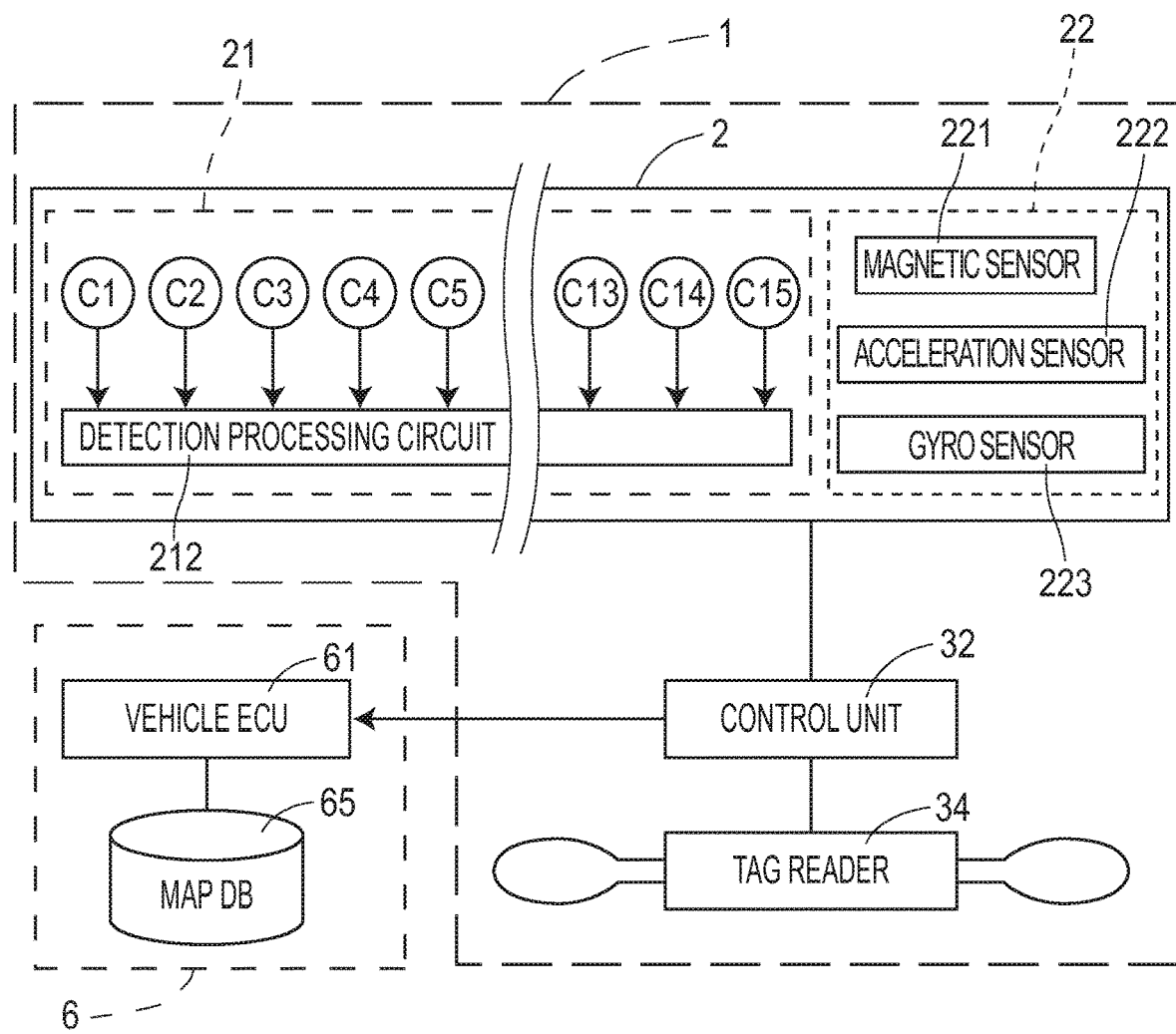
[FIG. 5]

[FIG. 6]
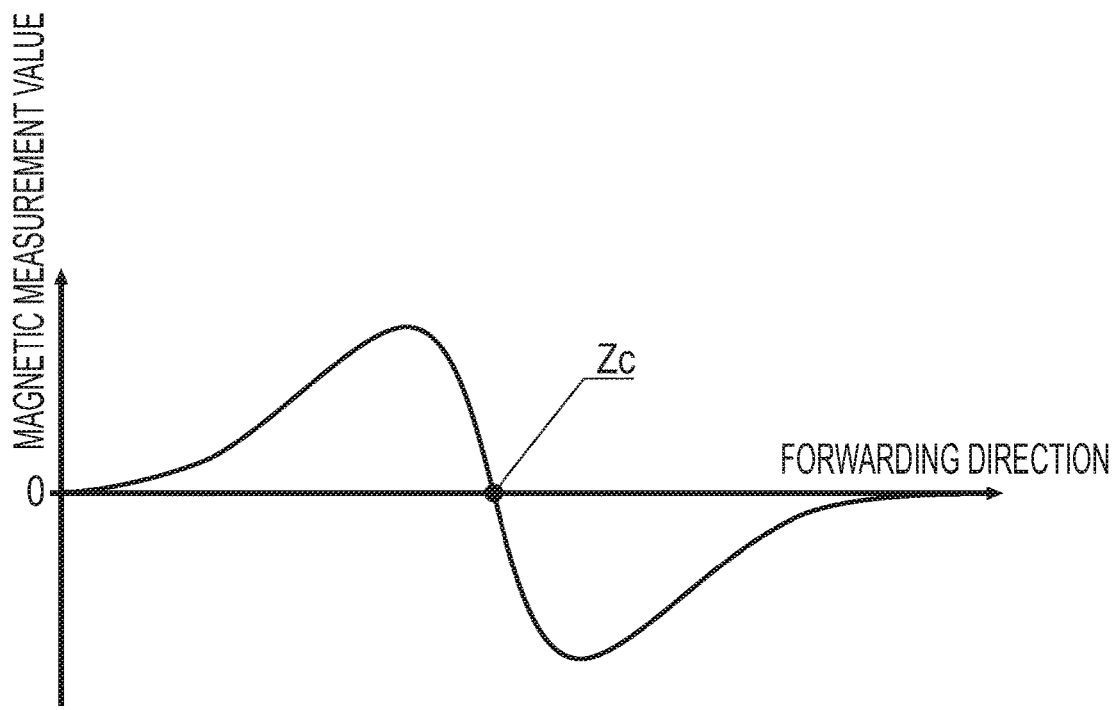

[FIG. 7]
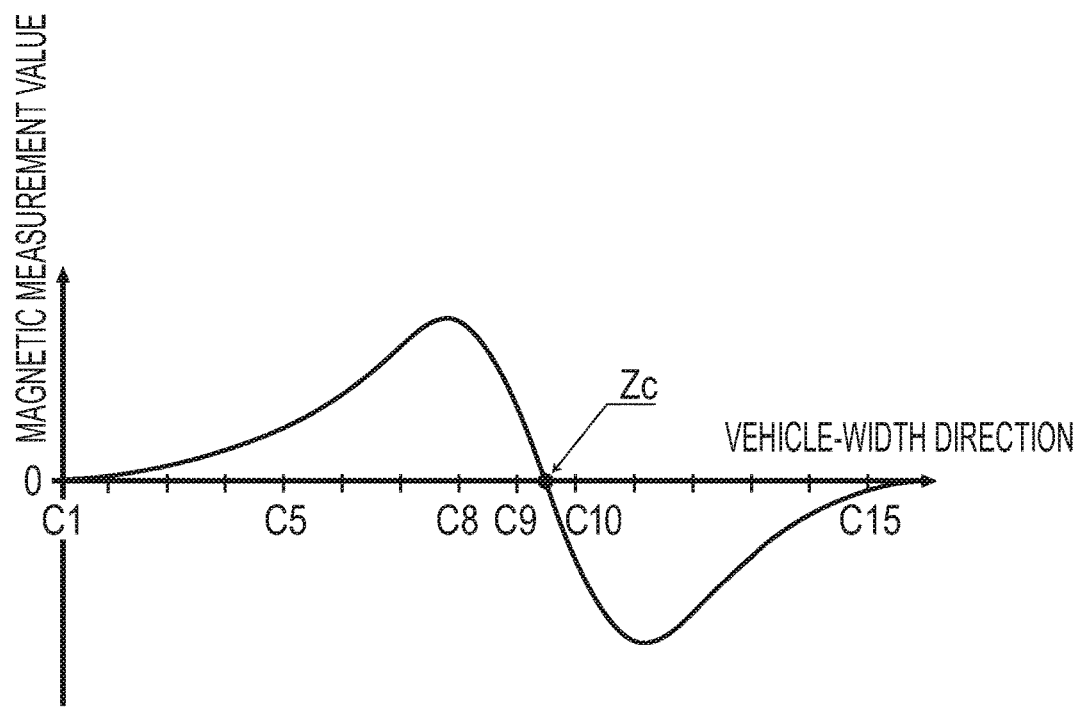

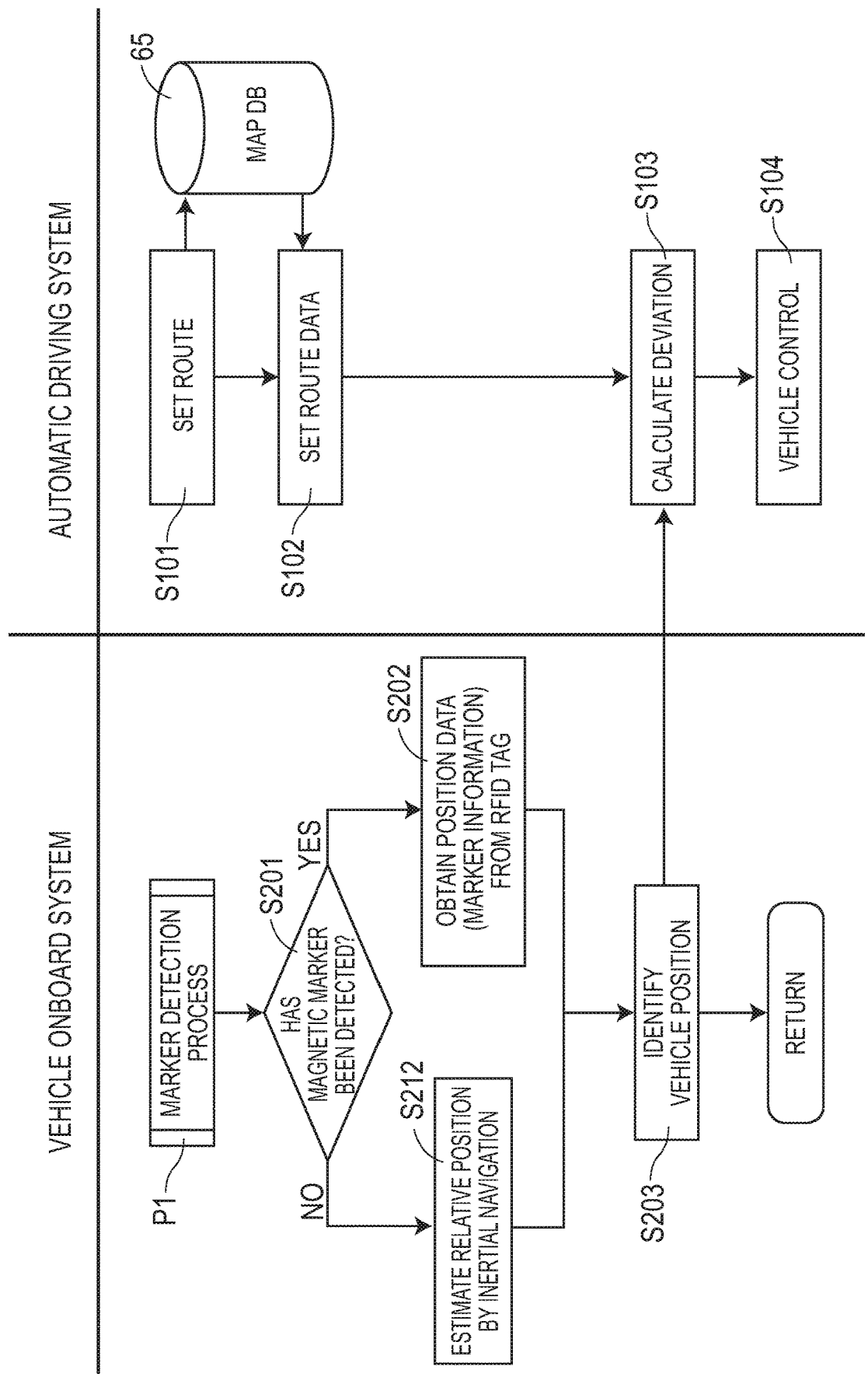
[FIG. 8]

[FIG. 9]
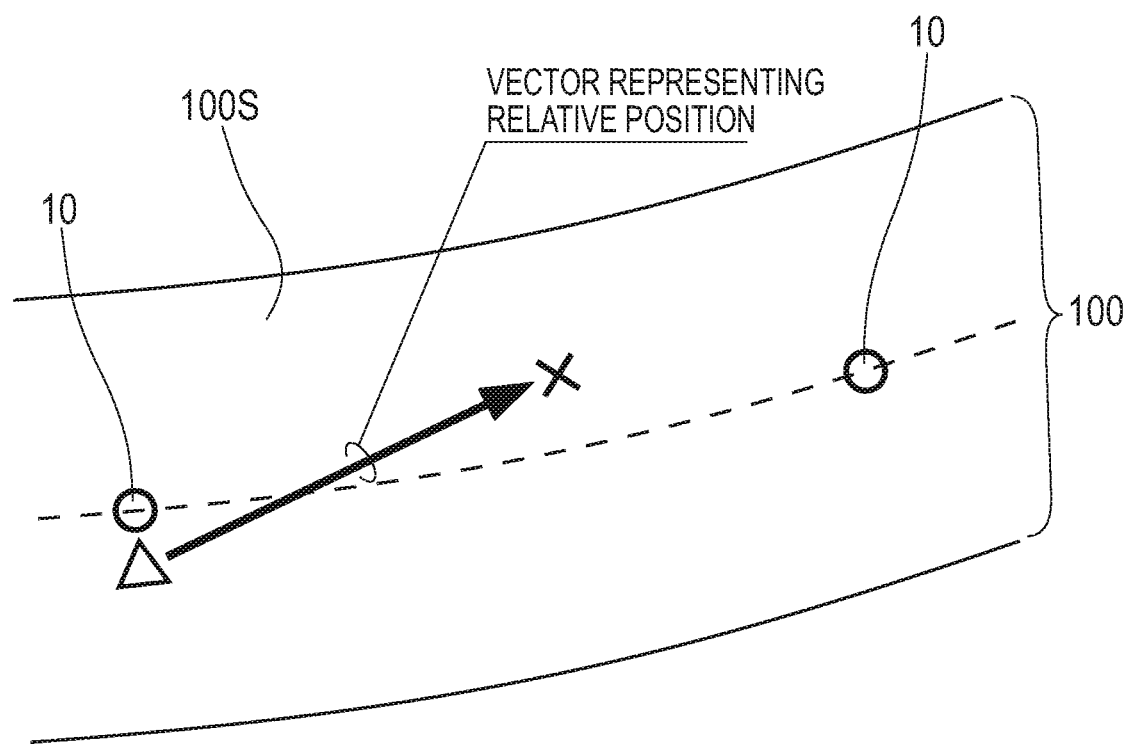

[FIG. 10]
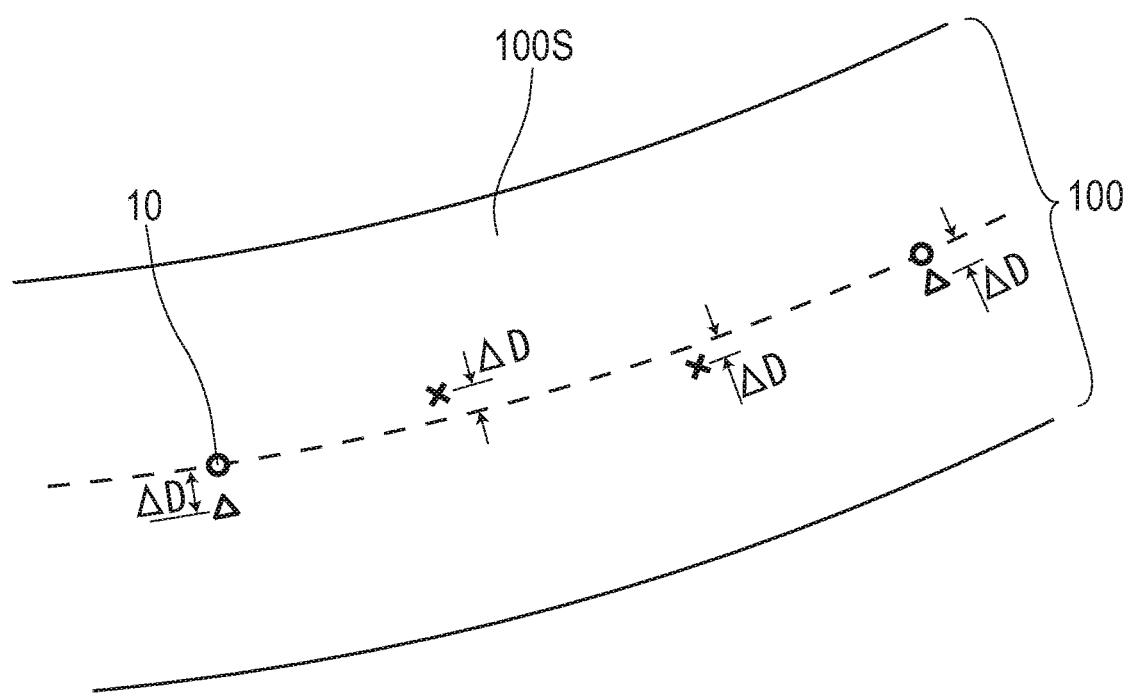

[FIG. 11]
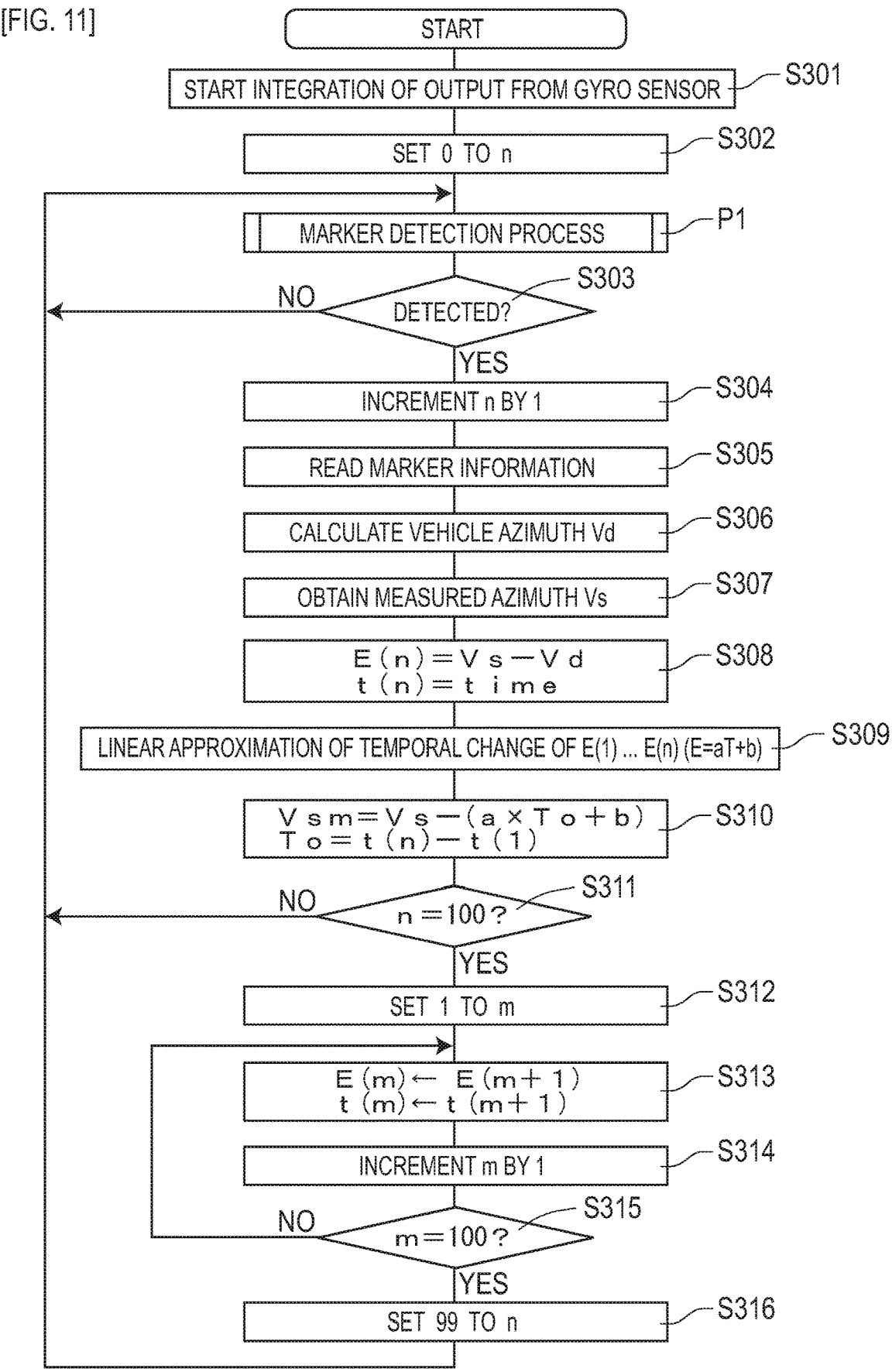

[FIG. 12]
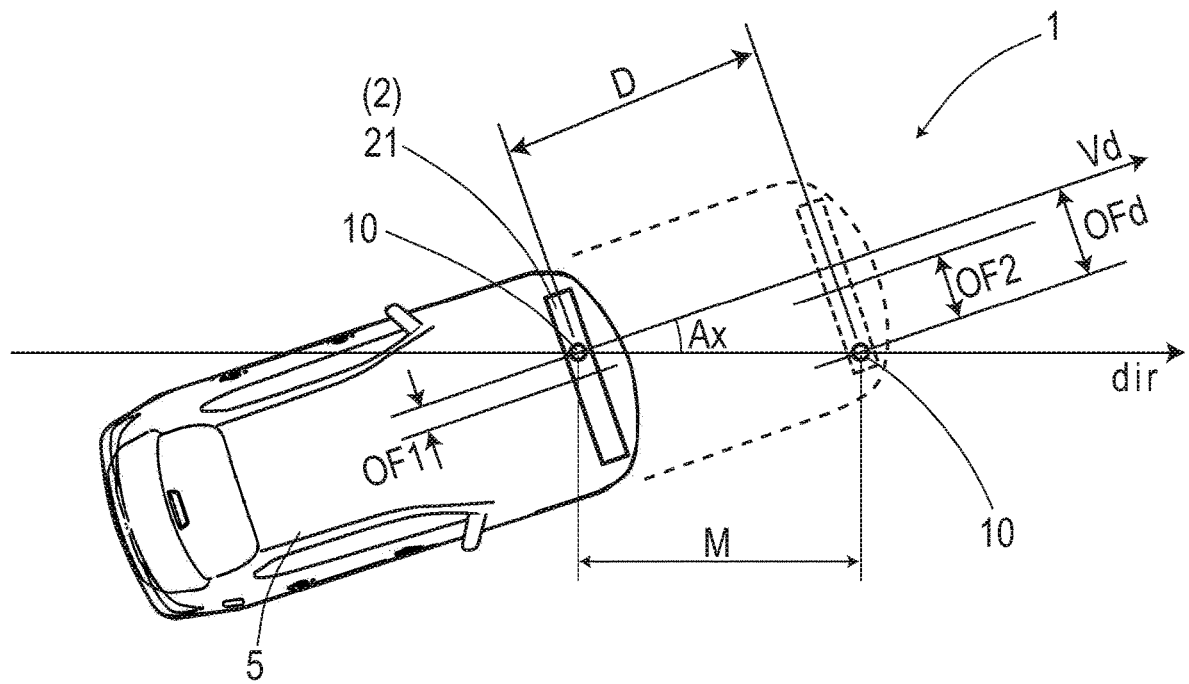

[FIG. 13]
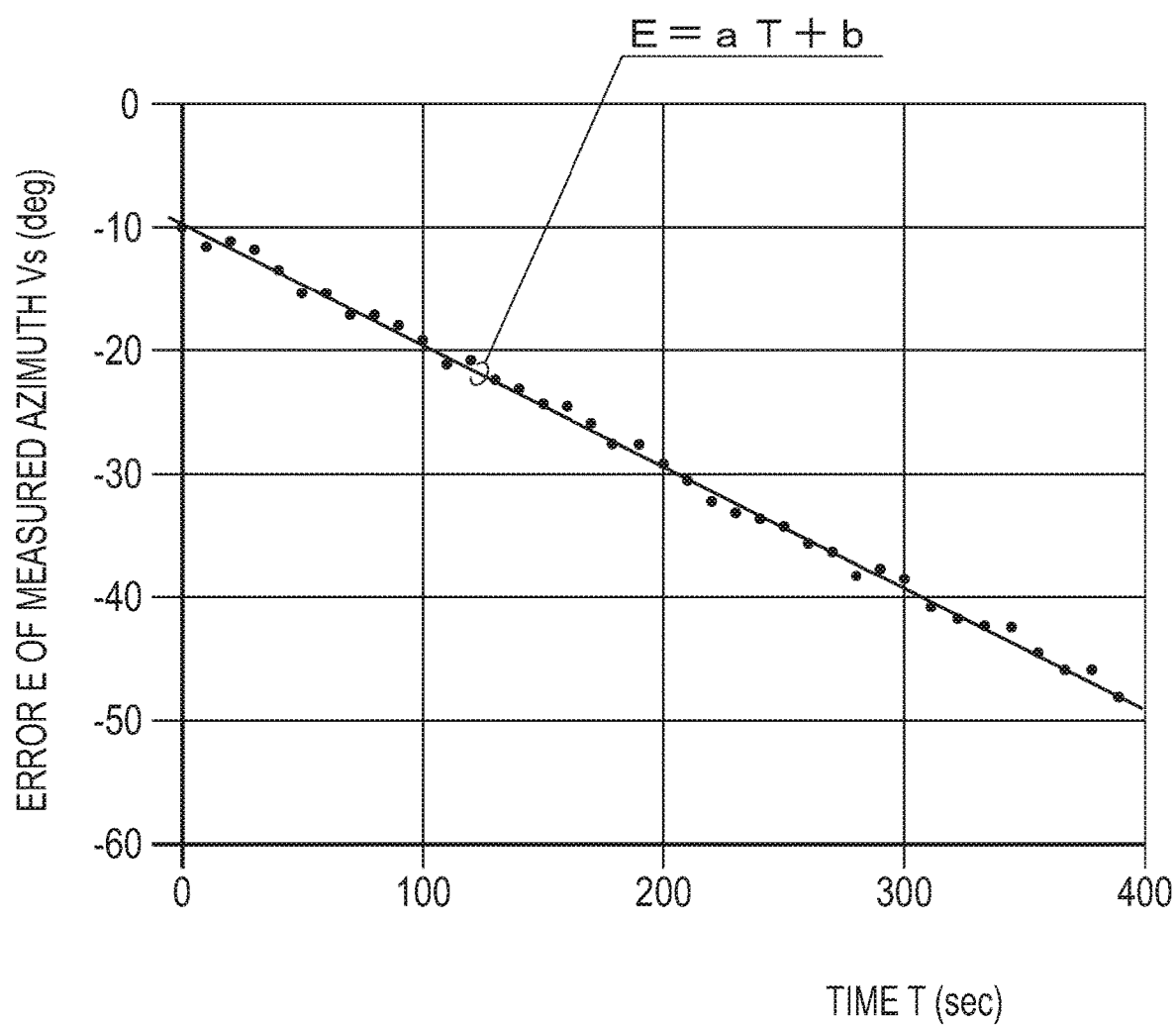

[FIG. 14]
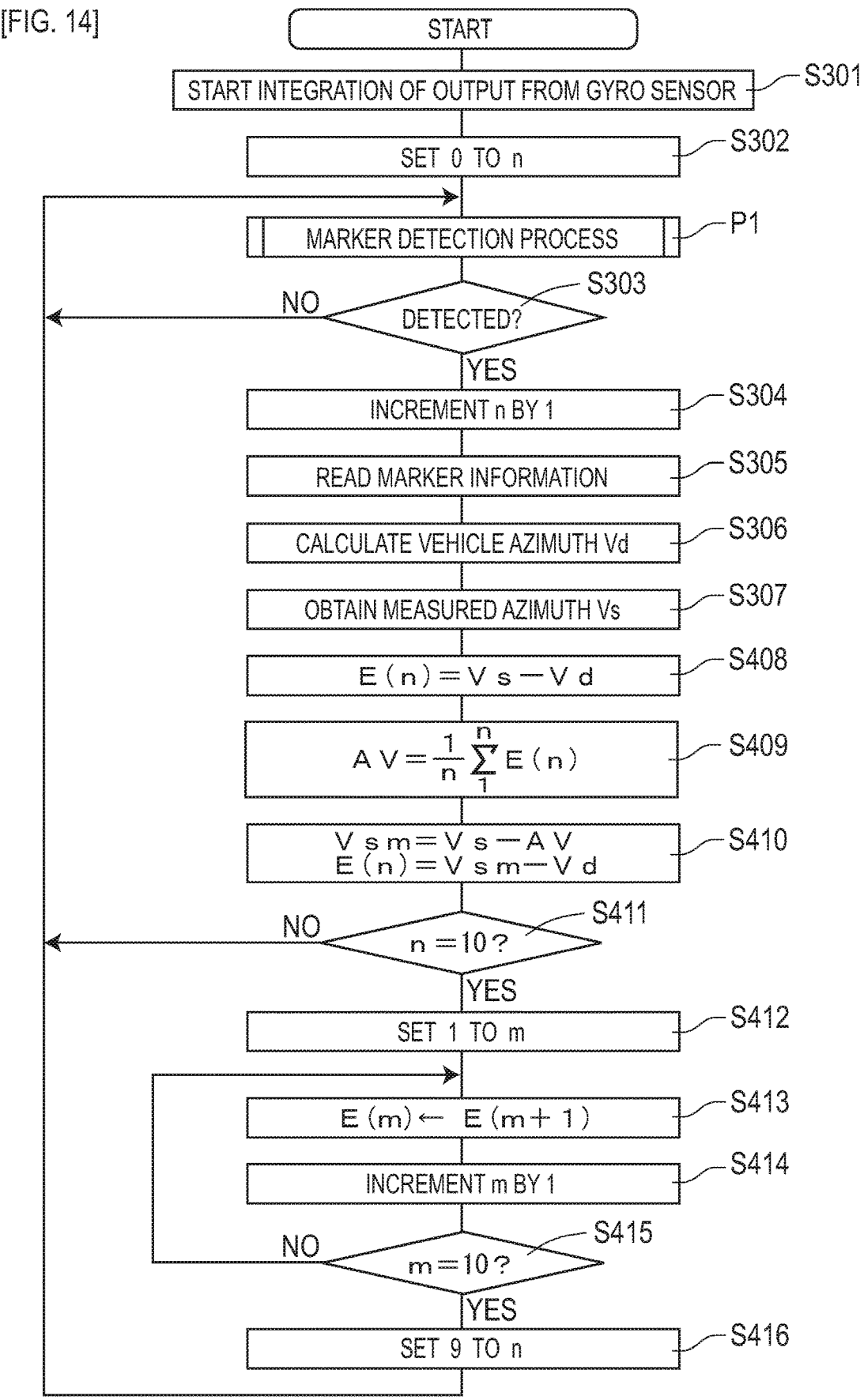

[FIG. 15]
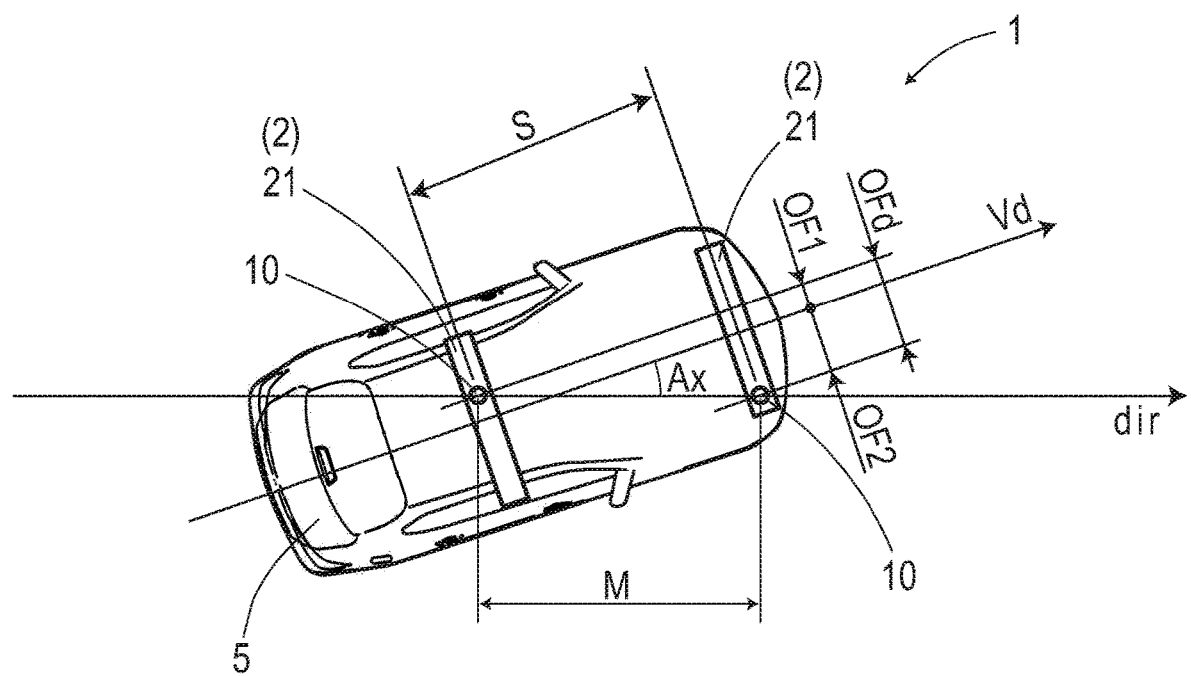

CORRECTION METHOD FOR GYRO SENSOR

TECHNICAL FIELD

The present invention relates to a correction method for a gyro sensor mounted on a vehicle.

BACKGROUND ART

In recent years, vehicles having incorporated therein a navigation system, a vehicle control system such as anti-skid control, an automatic driving system, and so forth have been increasing. In these systems, it is required to estimate an orientation (azimuth) of a vehicle, change in the orientation of the vehicle, and so forth with high accuracy. Thus, in most of the vehicles having these systems incorporated therein, a gyro sensor is adopted, which measures angular velocity of the vehicle in a rotating direction (yaw direction) about an axis in a vertical direction (for example, refer to Patent Literature 1 mentioned below).

CITATION LIST

Patent Literature

Patent Literature 1: Japanese Unexamined Patent Application Publication No. 2016-91412

SUMMARY OF INVENTION

Technical Problem

For example, an output from the gyro sensor may fluctuate (drift) depending on a lapse of time and environmental conditions such as fluctuations in temperature and vibrations. In this manner, output characteristics of the gyro sensor fluctuate depending on the lapse of time and the environmental conditions, there is a possibility that accuracy of the output from the gyro sensor and accuracy of measured amounts based on that output cannot be maintained.

The present invention was made in view of the above-described conventional problem, and is to provide a correction method for a gyro sensor mounted on a vehicle.

Solution to Problem

The present invention resides in a correction method for a gyro sensor which measures angular velocity of a vehicle about an axis in a vertical direction, including:

a generation process of performing a process on a difference between a measured azimuth obtained by performing a process on an sensor output, which is an output from the gyro sensor, and a vehicle azimuth estimated by using markers arranged along a traveling road of the vehicle to obtain correction information; and a correction process of correcting the sensor output or the measured azimuth by using the correction information.

Advantageous Effects of Invention

The correction method for the gyro sensor of the present invention includes the correction process using the correction information based on the difference between the measured azimuth based on the sensor output and the vehicle azimuth estimated by using the markers. The markers are arranged on the traveling road, and a possibility that positions of the markers fluctuate depending on a lapse of time and environmental conditions hardly arises. By using the vehicle azimuth estimated by using these markers, output characteristics of the gyro sensor that can fluctuate depending on the lapse of time and the environmental conditions can be effectively corrected.

BRIEF DESCRIPTION OF DRAWINGS

FIG. 1 is a front view of a vehicle when looked into in a first embodiment.

FIG. 2 is a descriptive diagram of a magnetic marker in the first embodiment.

FIG. 3 is a descriptive diagram of a laying mode of magnetic markers in the first embodiment.

FIG. 4 is a front view of an RFID tag in the first embodiment.

FIG. 5 is a descriptive diagram depicting a configuration of a vehicle onboard system in the first embodiment.

FIG. 6 is a descriptive diagram exemplarily depicting change of a magnetic measurement value in a forwarding direction at the time of passing over the magnetic marker in the first embodiment.

FIG. 7 is a descriptive diagram exemplarily depicting a distribution curve of the magnetic measurement value in a vehicle-width direction measured by magnetic sensors Cn arrayed in the vehicle-width direction in the first embodiment.

FIG. 8 is a flow diagram depicting a flow of an entire operation of the vehicle in the first embodiment.

FIG. 9 is a descriptive diagram of a method of estimating an own vehicle position by the vehicle onboard system in the first embodiment.

FIG. 10 is a descriptive diagram depicting deviation ΔD of the own vehicle position with respect to a traveling route in the first embodiment.

FIG. 11 is a flow diagram depicting a flow of a process of correcting a measured azimuth in the first embodiment.

FIG. 12 is a descriptive diagram of a method of detecting vehicle azimuth Vd in the first embodiment.

FIG. 13 is a descriptive diagram of a process of linear approximation of temporal change of error in measured azimuths in the first embodiment.

FIG. 14 is a flow diagram depicting a flow of a process of correcting a measured azimuth in a second embodiment.

FIG. 15 is a descriptive diagram of a method of detecting vehicle azimuth Vd in a third embodiment.

DESCRIPTION OF EMBODIMENTS

Modes for implementation of the present invention are specifically described by using the following embodiments.

First Embodiment

The present embodiment is an example in which vehicle onboard system 1 which estimates its own vehicle position (position of a vehicle) is combined with automatic driving system 6. In particular, this vehicle onboard system 1 has a function of correcting, by using magnetic markers 10, a measured azimuth derived from angular velocity outputted from gyro sensor 223. Details of this are described by using FIG. 1 to FIG. 13.

Vehicle onboard system 1 is configured to include, as in FIG. 1, measuring unit 2 which performs magnetic detection and so forth, tag reader 34 which obtains marker information regarding magnetic markers 10, control unit 32 which performs calculation process for identifying the own vehicle position, and so forth.

Automatic driving system 6 combined with this vehicle onboard system 1 is configured to include vehicle ECU 61 which performs automatic driving control and map database (map DB) 65 having stored therein detailed three-dimensional map data (3D map data). Vehicle ECU 61 controls, by taking the own vehicle position estimated by vehicle onboard system 1 as a control input value, a steering unit, an engine throttle, a brake, and so forth not depicted to cause vehicle 5 to automatically travel.

In the following, magnetic marker 10 to be laid in a road is generally described, and then details of measuring unit 2, tag reader 34, and control unit 32 are described.

Magnetic marker 10 is, as in FIG. 1 to FIG. 3, an example of a marker to be laid in road surface 100S of the road (one example of a traveling road) where vehicle 5 travels. This magnetic marker 10 forms a columnar shape having a diameter of 20 mm and a height of 28 mm. Magnetic marker 10 is laid, for example, in a state of being accommodated in a hole provided in road surface 100S (FIG. 1). A magnet forming magnetic marker 10 is a ferrite plastic magnet with magnetic powder of iron oxide as a magnetic material dispersed in a polymer material as a base material. This magnet has a property of a maximum energy product (BHmax)=6.4 kJ/m$^3$.

Specifications of magnetic marker 10 of the present embodiment are partially depicted in Table 1.

TABLE 1

| Magnet type | Ferrite plastic magnet |
|---|---|
| Diameter | φ 20 mm |
| Height | 28 mm |
| Magnetic flux density Gs of the surface | 45 mT |

This magnetic marker 10 acts with magnetism of a magnetic flux density of 8 μT (microtesla) at an upper-limit height of 250 mm in a range from 100 mm to 250 mm assumed as an attachment height of measuring unit 2. Also, in this magnetic marker 10, a magnetic flux density Gs of the surface indicating a magnetic strength on the surface is 45 mT.

Magnetic markers 10 are arranged, as in FIG. 3, along the center of lane 100 sectioned by left and right lane marks at pitches of, for example, 2 meters (marker span M). Although details will be described further below, in vehicle onboard system 1, a vehicle azimuth (orientation of the vehicle in a longitudinal direction, azimuth) is estimated with reference to a direction of a line segment connecting adjacent two magnetic markers 10. And, by using this vehicle azimuth as an azimuth serving as a reference, the measured azimuth derived from an output from gyro sensor 223 is corrected.

Note that a designed laying position of each magnetic marker 10 is at the center of lane 100. Therefore, the direction of the line segment connecting adjacent two magnetic markers 10 is designed to match a lane direction (direction of the traveling road). However, in practice, an error in a laying position of magnetic marker 10 is inevitable. Thus, a direction of the actual line segment connecting adjacent two magnetic markers 10 has an azimuth error, and is deviated from the lane direction. In the following, both are distinguished, and the lane direction is referred to as azimuth dir and the direction of the actual line segment connecting adjacent two magnetic markers 10 is referred to as azimuth dir(M).

To an upper end face of magnetic marker 10, RFID (Radio Frequency IDentification) tag 15 is attached as a wireless tag which wirelessly outputs information (refer to FIG. 2). RFID tag 15, which is one example of an information providing part, operates by wireless external power feeding, and transmits marker information regarding magnetic marker 10. Marker information includes position data indicating the designed laying position of its corresponding magnetic marker 10, azimuth data (azimuth information, azimuth dir) indicating the lane direction, and so forth.

Note that if laying positions (absolute positions) of adjacent two magnetic markers 10 are known, azimuth dir can be obtained by calculation. The position data indicating the laying positions of adjacent two magnetic markers 10 may be included as azimuth information in the marker information. Alternatively, the laying position of immediately-previous magnetic marker 10 may be stored in advance on a vehicle side and the laying position of immediately-previous magnetic marker 10 may be read when azimuth dir is calculated. In this case, the laying position of one magnetic marker 10 included in the marker information is one example of azimuth information.

RFID tag 15 forming one example of the information providing part is an electronic component having IC chip 157 implemented on a surface of tag sheet 150 (FIG. 4) cut out from, for example, a PET (PolyEthylene Terephthalate) film. On the surface of tag sheet 150, a printed pattern of loop coil 151 and antenna 153 is provided. Loop coil 151 is a receiving coil where an exciting current is generated by external electromagnetic induction. Antenna 153 is a transmission antenna for wirelessly transmitting marker information. RFID tag 15 is arranged on an upward-oriented end face of magnetic marker 10.

Next, measuring unit 2, tag reader 34, and control unit 32 included in vehicle 5 are described.

Measuring unit 2 is, as in FIG. 5, a unit having sensor array 21 as a magnetic detecting part and IMU (Inertial Measurement Unit) 22 integrated together. Measuring unit 2 having a narrow rod shape is attached to, for example, the inside of a front bumper or the like, in a state of facing road surface 100S (refer to FIG. 1). In the case of vehicle 5 of the present embodiment, the attachment height of measuring unit 2 with reference to road surface 100S is 200 mm.

Sensor array 21 of measuring unit 2 includes fifteen magnetic sensors Cn (n is an integer of 1 to 15) arrayed on one straight line and detection processing circuit 212 having a CPU and so forth not depicted incorporated therein. In sensor array 21, fifteen magnetic sensors Cn are equidistantly arranged with 10-centimeter pitches. Measuring unit 2 is attached to vehicle 5 so that an array direction of magnetic sensors Cn in sensor array 21 matches a vehicle-width direction.

Magnetic sensors Cn are sensors which detect magnetism by using the known MI effect (Magneto Impedance Effect) in which impedance of a magneto-sensitive body such as an amorphous wire sensitively changes in response to an external magnetic field. In magnetic sensors Cn, magneto-sensitive bodies are arranged along two orthogonal axial directions, thereby allowing detection of magnetism acting on the two orthogonal axial directions. Note in the present embodiment that magnetic sensors Cn are incorporated in sensor array 21 so that magnetic components in a forwarding direction and magnetic components in the vehicle-width direction can be detected.

Magnetic sensors Cn are highly-sensitive sensors having a measurement range of the magnetic flux density of ±0.6 mT and a magnetic flux resolution of 0.02 μT within the measurement range. In the present embodiment, a frequency of magnetic measurement by each magnetic sensor Cn of measuring unit 2 is set at 3 kHz so as to support high-speed traveling of vehicle 5.

Specifications of magnetic sensor Cn are partially depicted in Table 2.

TABLE 2

| | |
|---|---|
| Measurement range | ±0.6 mT |
| Magnetic flux resolution | 0.02 µT |
| Sampling frequency | 3 kHz |

As described above, magnetic marker 10 can act with magnetism having the magnetic flux density equal to or larger than 8 µT in the range from 100 mm to 250 mm assumed as the attachment height of magnetic sensors Cn. Magnetic marker 10 acting with magnetism having the magnetic flux density equal to or larger than 8 µT can be detected with high reliability by using magnetic sensors Cn having the magnetic flux resolution of 0.02 µT.

Detection processing circuit 212 (FIG. 5) of sensor array 21 is an arithmetic circuit which performs marker detection process for detecting magnetic marker 10 and so forth. This detection processing circuit 212 is configured by using a CPU (Central Processing Unit) which performs various calculations, memory elements such as a ROM (Read Only Memory) and a RAM (Random Access Memory), and so forth.

Detection processing circuit 212 obtains a sensor signal outputted from each of magnetic sensors Cn at the frequency of 3 kHz to perform marker detection process. Detection processing circuit 212 inputs detection result of the marker detection process to control unit 32. Although details will be described further below, in this marker detection process, in addition to detection of magnetic marker 10, a lateral shift amount detection process is performed, in which a lateral shift amount of vehicle 5 with respect to detected magnetic marker 10 is measured.

IMU 22 (FIG. 5) incorporated in measuring unit 2 is an inertial navigation unit which estimates a relative position of vehicle 5 by inertial navigation. IMU 22 includes magnetic sensor 221 as an electronic compass which measures the azimuth, acceleration sensor 222 which measures acceleration, gyro sensor 223 which measures angular velocity, and so forth. Gyro sensor 223 is a sensor which measures angular velocity (one example of an output) in a rotating direction about an axis in a vertical direction. For example, by combining the angular velocity measured by gyro sensor 223 and the azimuth measured by magnetic sensor 221, an absolute azimuth of vehicle 5 can be estimated with high accuracy.

IMU 22 calculates a displacement amount by double integration of the acceleration and integrates displacement amounts along the vehicle azimuth, thereby calculating a relative position with respect to a reference position. By using the relative position estimated by IMU 22, it is possible to estimate the own vehicle position also when vehicle 5 is positioned in an intermediate position between adjacent two magnetic markers 10.

Tag reader 34 is a communication unit which wirelessly communicates with RFID tag 15 arranged on a surface of magnetic marker 10. Tag reader 34 wirelessly transmits electric power required for operation of RFID tag 15, and receives marker information transmitted from RFID tag 15. As marker information, as described above, there are position data indicating the laying position (absolute position) of corresponding magnetic marker 10, azimuth dir which is azimuth data (azimuth information) indicating the lane direction, and so forth.

Control unit 32 is a unit which controls measuring unit 2 and tag reader 34 and also estimates the own vehicle position, which is a position of vehicle 5, in real time. The own vehicle position estimated by control unit 32 is inputted to, for example, vehicle ECU 61 configuring automatic driving system 6.

Control unit 32 includes an electronic substrate (omitted in the drawing) having implemented thereon a CPU which performs various computations, memory elements such as a ROM and a RAM, and so forth. A method of estimating the own vehicle position by control unit 32 varies depending on a case in which vehicle 5 reaches magnetic marker 10 having RFID tag 15 attached thereto or a case in which vehicle 5 is positioned in the intermediate position between adjacent magnetic markers 10. Although details will be described further below, in the former case, control unit 32 estimates the own vehicle position by using the marker information received from RFID tag 15 attached to magnetic marker 10. On the other hand, in the latter case, the own vehicle position is estimated based on the relative position of vehicle 5 estimated by inertial navigation.

Next, (1) marker detection process by vehicle onboard system 1 of the present embodiment and (2) a flow of an entire operation of vehicle 5 are described, and then (3) measured azimuth correction process is described.

(1) Marker Detection Process

The marker detection process is a process to be performed by sensor array 21 of measuring unit 2. Sensor array 21 performs marker detection process at the frequency of 3 kHz by using magnetic sensors Cn.

As described above, magnetic sensors Cn are configured to measure magnetic components in the forwarding direction and magnetic components in the vehicle-width direction of vehicle 5. For example, when these magnetic sensors Cn move in the forwarding direction to pass directly above magnetic marker 10, the magnetic measurement value in the forwarding direction has its sign reversed before and after passing magnetic marker 10 as in FIG. 6 and changes so as to cross zero at a position directly above magnetic marker 10. Therefore, during traveling of vehicle 5, when zero-cross Zc occurs in which the sign of magnetism in the forwarding direction detected by any magnetic sensor Cn is reversed, it can be determined that measuring unit 2 is positioned directly above magnetic marker 10. Detection processing circuit 212 determines that magnetic marker 10 is detected when measuring unit 2 is positioned directly above magnetic marker 10 and zero-cross of the magnetic measurement value in the forwarding direction occurs as described above.

Also, for example, as for a magnetic sensor with the same specification as that of magnetic sensors Cn, a movement along a virtual line in the vehicle-width direction passing directly above magnetic marker 10 is assumed. In this case, the magnetic measurement value in the vehicle-width direction has its sign reversed on both sides across magnetic marker 10 and changes so as to cross zero at a position directly above magnetic marker 10. In the case of measuring unit 2 having fifteen magnetic sensors Cn arrayed in the vehicle-width direction, the sign of the magnetic measurement value in the vehicle-width direction to be detected by magnetic sensor Cn varies depending on which side the unit is present with respect to magnetic marker 10 (FIG. 7).

Based on a distribution curve of FIG. 7 exemplarily depicting magnetic measurement values in the vehicle-width direction of each of magnetic sensors Cn of measuring unit 2, it is possible to identify a position of magnetic marker 10 in the vehicle-width direction by using zero-cross Zc where the sign of the magnetic measurement value in the vehicle-width direction is reversed. When zero-cross Zc is positioned in an intermediate position (not limited to the center) between adjacent two magnetic sensors Cn, the intermediate position between adjacent two magnetic sensors Cn across zero-cross Zc is the position of magnetic marker 10 in the vehicle-width direction. Alternatively, when magnetic sensor Cn is present in which the magnetic measurement value in the vehicle-width direction is zero and the signs of the magnetic measurement values of magnetic sensors Cn on both outer sides are reversed, a position directly below that magnetic sensor Cn is the position of magnetic marker 10 in the vehicle-width direction. Detection processing circuit 212 measures a deviation of the position of magnetic marker 10 in the vehicle-width direction with respect to the center position (position of magnetic sensor C8) of measuring unit 2 as the lateral shift amount of vehicle 5 with respect to magnetic marker 10 (lateral shift amount detection process). For example, in the case of FIG. 7, the position of zero-cross Zc is a position corresponding to C9.5 in the neighborhood of a midpoint between C9 and C10. As described above, since the pitch between magnetic sensors C9 and C10 is 10 cm, the lateral shift amount of magnetic marker 10 is (9.5−8)×10 cm with reference to C8 positioned at the center of measuring unit 2 in the vehicle-width direction. Then, the lateral shift amount, which is a deviation of vehicle 5 in the vehicle-width direction with reference to magnetic marker 10, can be calculated by reversing the sign of the above-described deviation (lateral shift amount detection process). Measuring unit 2 inputs, to control unit 32, the lateral shift amount with its sign reversed in accordance with to which side, left or right, vehicle 5 is shifted with respect to magnetic marker 10.

(2) Entire Operation of Vehicle

Next, the entire operation of vehicle 5 including vehicle onboard system 1 and automatic driving system 6 is described with reference to FIG. 8 to FIG. 10.

When a traveling route (predetermined route) is set in automatic driving system 6 (S101), corresponding data is read from map DB 65 having stored therein 3D map data, and detailed route data serving as a control target for automatic driving is set (S102). The route data is data including, for example, as indicated by a broken line in FIG. 9 and FIG. 10, at least a sequence of points represented as data of absolute positions.

On the other hand, vehicle onboard system 1 repeatedly performs marker detection process P1 by the above-described sensor array 21 under control of automatic driving. If any magnetic marker 10 has been detected (S201: YES), vehicle onboard system 1 performs reading of marker information outputted from RFID tag 15 (S202). Then, vehicle onboard system 1 estimates its own vehicle position (exemplarily indicated by a Δ mark in FIG. 9) with reference to the laying position of magnetic marker 10 indicated by position data included in the marker information (S203). Specifically, a position obtained by shifting from the laying position of magnetic marker 10 by the lateral shift amount measured by measuring unit 2 in the marker detection process is estimated as the own vehicle position.

On the other hand, if vehicle 5 is positioned in the intermediate position between adjacent two magnetic markers 10 and any magnetic marker 10 has not been detected (S201: NO), vehicle onboard system 1 takes the own vehicle position (position of the Δ mark in FIG. 9) identified based on the laying position of magnetic marker 10 immediately-previously detected as a reference position and estimates the relative position of vehicle 5 by inertial navigation (S212). Specifically, as described above, vehicle onboard system 1 calculates the displacement amount by double integration of measured acceleration by IMU 22 incorporated in measuring unit 2. Then, along the azimuth of vehicle 5 identified by using the angular velocity outputted from gyro sensor 22 and so forth, vehicle onboard system 1 integrates the displacement amounts, thereby estimating the relative position of vehicle 5 with respect to the above-described reference position. As exemplarily depicted in FIG. 9, vehicle onboard system 1 estimates a position of a x mark obtained by moving from the reference position by this relative position as the own vehicle position (S203). Note in the drawing that one example of a vector representing this relative position is indicated by an arrow.

The own vehicle positions (positions of the Δ mark and the x mark in FIG. 9) estimated by vehicle onboard system 1 are inputted to vehicle ECU 61 configuring automatic driving system 6. Vehicle ECU 61 calculates deviations ΔD of the own vehicle position with respect to the route data of control target values indicated by the broken line in FIG. 10 (S103). Then, vehicle ECU 61 performs vehicle control such as steering control based on these deviations ΔD (S104) to achieve automatic driving.

(3) Measured Azimuth Correction Process

As described above, in vehicle onboard system 1, lane 100 (refer to FIG. 3, traveling road) where magnetic markers 10 are arranged with pitches of marker span M=2 m is assumed. Since magnetic markers 10 are arranged along the center of lane 100, a designed direction of the line segment connecting adjacent two magnetic markers 10 matches the lane direction (azimuth dir). Azimuth dir of the lane direction corresponding to the designed direction of the line segment connecting two magnetic markers 10 is wirelessly outputted from RFID tag 15 annexed to magnetic marker 10 as azimuth data (part of the marker information).

In vehicle onboard system 1, by using magnetic markers 10, vehicle azimuth Vd indicating the orientation of vehicle 5 is estimated. Then, in vehicle onboard system 1, by using this vehicle azimuth Vd, measured azimuth Vs is corrected. As described above, vehicle azimuth Vd with reference to the markers has an error caused by the error in the laying positions of magnetic markers 10. The correction process of FIG. 11 is a process of correcting measured azimuth Vs by using vehicle azimuth Vd with reference to the markers having an error. The flow of this correction process is described with reference to the flow diagram of FIG. 11.

For example, when automatic driving system 6 is started, control unit 32 controls IMU 22 so as to start calculation of integrating output (angular velocity, sensor output) of gyro sensor 223 (S301). By the calculation of integrating the sensor output, measured azimuth Vs is generated, which is a measurement value of a turning angle of vehicle 5. Also, control unit 32 sets 0, which is an initial value, to variable n to be used during the process (S302).

For example, control unit 32 during the control of automatic driving controls sensor array 21 to repeatedly perform marker detection process P1 including the lateral shift amount detection process (S303: NO). If magnetic marker 10 is detected (S303: YES), control unit 32 first increments variable n by 1 (S304). Then, control unit 32 controls tag reader 34 to cause it to read marker information from RFID tag 15 (S305, azimuth information obtaining process). As described above, this marker information includes azimuth data (azimuth dir) of the lane direction corresponding to the designed direction of the segment connecting two magnetic markers 10.

Subsequently, control unit 32 estimates vehicle azimuth Vd by using the lateral shift amounts with respect to magnetic markers 10 (S306, azimuth estimation process). This estimation of vehicle azimuth Vd at step S306 requires the lateral shift amounts with respect to two magnetic markers 10. In detail, estimation of vehicle azimuth Vd is performed when second magnetic marker 10 is detected. Preferably, marker detection process P1 is performed before the above-described processes at steps S301 and S302 are performed and, when second magnetic marker 10 is detected, the processes at steps S301 and S302 are performed.

Here, details of the azimuth estimation process at step S306 for calculating vehicle azimuth Vd are described with reference to FIG. 12. In this azimuth estimation process, vehicle azimuth Vd is estimated by using lateral shift amounts OF1 and OF2 respectively measured for adjacent two magnetic markers 10. Here, lateral shift amount OF1 is the lateral shift amount with respect to first magnetic marker 10, and lateral shift amount OF2 is the lateral shift amount with respect to second magnetic marker 10. Lateral shift amounts OF1 and OF2 are each defined so as to have a positive or negative value by taking the center in a width direction of vehicle 5 as a boundary.

As in FIG. 12, control unit 32 calculates shift angle Ax of vehicle azimuth Vd with respect to direction dir(M) of the line segment connecting two magnetic markers 10 based on lateral shift amounts OF1 and OF2 with respect to adjacent two magnetic markers 10 as follows.

Change in lateral shift amount $OFd=|OF2-OF1|$

Shift angle $Ax=\arcsin(OFd/M)$

Direction dir(M) of the actual line segment connecting adjacent two magnetic markers 10 is the absolute azimuth having an error in azimuth shift due to the error in the laying positions of magnetic markers 10. Since this azimuth shift error is indefinite, in the azimuth estimation process of the present embodiment, vehicle azimuth Vd with reference to the markers is estimated as follows, with reference to azimuth dir (marker information), which is a design value of the direction dir(M) of the line segment.

Vehicle azimuth $Vd=\text{dir}+Ax$

In this azimuth estimation process, shift angle Ax obtained with reference to direction dir(M) of the actual line segment connecting adjacent two magnetic markers 10 is added to azimuth dir (marker information), which is the design value of the lane direction, thereby obtaining vehicle azimuth Vd with reference to the markers. Therefore, this vehicle azimuth Vd with reference to the markers has influence of positional errors of magnetic markers 10.

Subsequently to the estimation of vehicle azimuth Vd by step S306, control unit 32 obtains measured azimuth Vs, which is an output from IMU 22 (S307). Then, control unit 32 causes a difference between measured azimuth Vs and vehicle azimuth Vd to be stored as error E(n) in measured azimuth Vs and causes a time (current time) at the time of measurement of measured azimuth Vs to be stored as t(n) (S308). In this manner, control unit 32 generates a data string formed of a combination of error E(n) and time t(n) (one example of a generation process).

Subsequently, control unit 32 linearly approximates change of E(1)...E(n) with respect to t(1)...t(n) to obtain a linear equation (correction information) of E=aT+b (S309, refer to FIG. 13. One example of the generation process). Here, E is an angular amount representing an error in measured azimuth Vs, and T is time. Also, "a" configuring the correction information is a gradient of an approximate straight line of E=aT+b and "b" is an intercept of the approximate straight line. Note in the present embodiment that linear approximation is performed by the least square method.

After the approximate straight line of E=aT+b is obtained by the approximation process exemplarily depicted in FIG. 13, control unit 32 calculates corrected measurement azimuth Vsm by subtracting error E (correction amount) from measured azimuth Vs (S310). By using the above-described approximate straight line, error E is (axTo+b). Here, To is time corresponding to data string E(n), and To=t(n)−t(1). By using this error E, control unit 32 obtains corrected measured azimuth Vsm=Vs−E=Vs−(axTo+b).

For example, under the control of automatic driving, the process of FIG. 11 is repeatedly performed, and E(n) is sequentially added until variable n reaches 100 (flow from S311: NO to S308). In a period until variable n reaches 100 (S311: NO), with data string E(n) not satisfying 100 pieces, linear approximation at step S309 and calculation of the corrected value at step S310 are performed.

When variable n reaches 100 and a string of 100 pieces of data E(1)...E(100) is formed (S311: YES), control unit 32 performs process for retaining the string of 100 pieces of data E(1)...E(100) as the latest data. To perform this process, control unit 32 first sets 1 to variable m (S312). Then, control unit 32 rewrites m-th error E(m) as (m+1)-th error E(m+1) and rewrites m-th time t(m) as (m+1)-th time t(m+1) (S313).

Control unit 32 increments variable m by 1 (S314) and repeats the rewrite process at step S313 until variable m reaches 100 (S315: NO). When variable m reaches 100 (S315: YES), data E(1), which is the most temporally-obsolete data of the original string of 100 pieces of data E(1)...E(100), is deleted, and E(2)...E(100) is sequentially brought down to form a string of 99 pieces of data E(1)...E(99). Then, control unit 32 sets 99 to variable n as preparation for the next process loop (S316), and then performs the next loop. At step S308 in the next loop, control unit 32 sets new error data to E(100) to form a string of the latest 100 pieces of data E(1)...E(100). Then, with the string of the latest data E(1)...E(100), control unit 32 performs the process of linear approximation (S309), the process of correcting measured azimuth Vs (S310), and so forth.

As described above, vehicle onboard system 1 of the present embodiment performs correction of measured azimuth Vs by using magnetic markers 10. By using corrected measured azimuth Vsm with improved accuracy, it is possible to cause vehicle 5 to perform automatic traveling with high accuracy by automatic driving control. Here, since magnetic markers 10 are fixed to a road side, a possibility of fluctuation of their positions is small. And, therefore, the direction of the line segment connecting adjacent two magnetic markers 10 has a less possibility of azimuth fluctuation and is stable. In vehicle onboard system 1, vehicle azimuth Vd is estimated by using this direction of the line segment, and this vehicle azimuth Vd is used as an azimuth serving as a reference to correct measured azimuth Vs. According to the correction process using vehicle azimuth Vd based on the direction of the line segment connecting adjacent two magnetic markers 10, measured azimuth Vs can be corrected with high accuracy.

Here, a concept of the process of correcting measured azimuth Vs is described. If rotation in a yaw direction acting on vehicle 5 (rotation direction about an axis in the vertical direction) does not occur and its rotation amount is zero (zero point), the angular velocity measured by gyro sensor 223 is ideally zero (deg/second). However, in accordance with influence such as a temporal change or a change in temperature, the zero point of gyro sensor 223 may be deviated (drifted). If this drift occurs, the angular velocity outputted from the gyro sensor 223 is not zero at the zero point, and an erroneous offset occurs. This offset at the zero point is integrated when angular velocities are temporally integrated to obtain measured azimuth Vs and becomes apparent as an error component in measured azimuth Vs. Since the offset due to the above-described drift is nearly constant, the error derived from the offset has a value close to an amount obtained by multiplying the offset amount by a time corresponding to an integral interval. In the correction process of the present embodiment, in (a×To+b), which is the correction amount of measured azimuth Vs, the offset due to the above-described drift corresponds to "a", and To corresponds to the time corresponding to the integral interval. That is, correction amount (a×To) is an amount corresponding to time integration of offset "a" due to the drift included in the output of gyro sensor 223. In place of correction of subtracting correction amount (a×To) from measured azimuth Vs, correction of subtracting offset "a" from the output (angular velocity) of the gyro sensor may be performed and then a measured azimuth may be obtained by time integration.

The "b" portion of the correction amount of (a×To+b) to be subtracted from measured azimuth Vs is a portion corresponding to an initial value of the difference between measured azimuth Vs and vehicle azimuth Vd. By matching measured azimuth Vs with vehicle azimuth Vd at the start of the integral interval, the correction amount corresponding to "b" can be made as zero.

In the present embodiment, automatic traveling control is assumed in which the traveling road where magnetic markers 10 are arranged along the center of the lane is taken as a target and vehicle 5 is caused to travel so as to trace magnetic markers 10. Here, in practice, a laying error of magnetic marker 10 with respect to the center line of the lane, a measurement error of the absolute position of magnetic marker 10, and so forth are inevitable. And, if the laying error, the measurement error, and so forth of magnetic markers 10 are present, direction dir (M) of the line segment connecting adjacent two magnetic markers is deviated from the actual lane direction dir. Thus, when an angular error occurs in the direction of the above-described line segment, an error occurs in E(n) at step S308 (FIG. 11) due to this angular error. On the other hand, the angular error in the direction of the above-described line segment is thought to be dispersed to both positive and negative sides with respect to the actual lane direction. Influence of this angular error can be relatively easily suppressed because it can be cancelled by the linear approximation at step S309. Therefore, in the correction process of the present embodiment, influence of the laying errors in magnetic markers 10 is suppressed, and the angular velocity or measured azimuth Vs outputted from gyro sensor 223 can be corrected with high accuracy.

As described above, in vehicle onboard system 1 of the present embodiment, measured azimuth Vs of gyro sensor 223 can be corrected by using magnetic markers 10. With an improvement in accuracy of the measured azimuth of gyro sensor 223, it is possible to improve accuracy in driving assist control in automatic driving and so forth.

In the present embodiment, as azimuth information to be included in the marker information, azimuth dir indicating the designed direction of the line segment connecting adjacent two magnetic markers 10 is exemplarily described. The azimuth information is not necessarily information about the azimuth itself. For example, a combination of the laying positions (absolute positions) of adjacent two magnetic markers 10 or the like can be one example of azimuth information which can identify the azimuth.

As the azimuth information to be included in the marker information, information indicating the lane direction may be used. In this case, the direction of the line segment connecting adjacent two magnetic markers 10 may be deviated from the lane direction. The deviation of the direction of the line segment connecting adjacent two magnetic markers 10 from the lane direction can be an error in E(n) at step S308. As described above, influence by the error in E(n) can be suppressed by the linear approximation process at step S309 (FIG. 11). Also, in a configuration of the second embodiment, which will be described next, the influence by the error in E(n) can be suppressed by calculation of obtaining an average value of E(n). It is only required that magnetic markers 10 be arranged along the direction of the lane forming the traveling road.

Note in the present embodiment that, at step S309 in FIG. 11, approximation process is performed by taking temporal change of 100 errors E(n) at maximum as targets. If the number of errors E(n) for approximation targets is too many, the period of time corresponding to errors E(n) is prolonged, and there is a possibility that environmental changes such as fluctuations in temperature during that period become not negligible. When these fluctuations in temperature or the like that are not negligible occur, there is a possibility that temporally-obsolete errors E(n) before the time when the fluctuations in temperature or the like occur have been changed to become ineligible as original data for approximation process. From this, in the configuration of the present embodiment, as the number of errors E(n) as approximation targets, 100 at maximum is appropriate. As a matter of course, this number depends on marker span M, which is the pitch between magnetic markers 10. When the marker span is longer than marker span M=2 m of the present embodiment, the number may be set as being smaller. When the marker span is shorter, the number may be set as being large.

Second Embodiment

The present embodiment is an example in which, in the vehicle onboard system of the first embodiment, details of the process of correcting measured azimuth Vs are changed. Details of this are described with reference to the flow diagram of FIG. 14. The drawing is an alternative diagram of FIG. 11, which is referred to in the first embodiment.

In the correction process (FIG. 14) to be performed by a vehicle onboard system of the present embodiment, processes until vehicle azimuth Vd and measured azimuth Vs are obtained (processes from S301 to S307) are similar to the processes from S301 to S307 in FIG. 11 of the first embodiment.

After vehicle azimuth Vd and measured azimuth Vs are obtained, a control unit (reference sign 32 in FIG. 5) of the present embodiment obtains a difference between measured azimuth Vs and vehicle azimuth Vd, and regards and stores this difference as error E(n) in measured azimuth Vs (S408).

Then, control unit 32 obtains average value AV (correction information) of E(1) . . . E(n) (S409, one example of a generation process).

Control unit 32 handles average value AV obtained at step S409 as a correction amount, and subtracts average value AV from measured azimuth Vs obtained at step S307 (shifts measured azimuth Vs by average value AV), thereby obtaining corrected measured azimuth Vsm (S410). Furthermore, control unit 32 recalculates error E(n) with corrected measured azimuth Vsm and causes the result to be stored (S410).

For example, under control of automatic driving, the correction process of FIG. 14 is repeatedly performed, and E(n) is sequentially added until variable n reaches 10 (flow from S411: NO to S408). In a period until variable n reaches 10 (S411: NO), with data string E(n) not satisfying 10 pieces, calculation of average value AV at step S409 and calculation of a corrected value at step S410 are performed.

When variable n reaches 10 and a string of 10 pieces of data E(1) . . . E(10) is formed (S411: YES), control unit 32 performs process for retaining the string of 10 pieces of data E(1) . . . E(10) as the latest data (series of processes from S411 to S416). These processes are almost similar to the processes from step S311 to S316 in FIG. 11 referred to in the first embodiment, except for a difference in number of pieces of data in the string between 10 and 100. After the number of pieces of data in the string reaches 10, with 10 pieces of E(n), calculation of average value AV at step S409 and calculation of the corrected value at step S410 are performed.

In the present embodiment, measured azimuth Vs is corrected by using the average value of errors E(n) in measured azimuth Vs. Here, as with the first embodiment, vehicle azimuth Vd, which is an azimuth serving as a reference, is estimated by using magnetic markers. As described in the first embodiment, there is an error in laying positions of the magnetic markers, and deviation from a designed laying line is inevitable. And, the error in the laying position of the magnetic marker directly leads to an error in vehicle azimuth Vd estimated on a vehicle side.

By contrast, in a configuration of the present embodiment, for example, a total sum of errors E(n) in measured azimuth Vs is calculated and is then divided by variable n indicating the number of pieces of data to obtain average value AV. According to the calculation of the total sum of errors E(n), the above-described error in vehicle azimuth Vd can be cancelled. Thus, in the configuration of the present embodiment, measured azimuth Vs can be corrected with high accuracy while influence of the error in the laying positions of magnetic markers 10 is suppressed.

Note that while the number of pieces of data is set to 10 as a population parameter to calculate average value AV of errors E(n), this number of pieces of data can be changed as appropriate. In place of 10, the number may be 20 or 30.

Note that other configurations and operations and effects are similar to those of the first embodiment.

Here, the process of correcting measured azimuth Vs in the first embodiment and the process of correcting measured azimuth Vs in the second embodiment are described as being compared with each other. In the process of correcting measured azimuth Vs in the first embodiment, an approximate straight line representing temporal change of error E(n) is obtained (FIG. 13), and measured azimuth Vs is corrected by using gradient "a" and intercept "b" of this approximate straight line. In the correction process of the first embodiment, since temporal change of error E(n) are used, no problem arises even if, for example, a time section as a target includes a vehicle's stop period. For example, even if magnetic marker detection is interrupted because of vehicle's stopping and then magnetic marker detection is restarted in accordance with restart of traveling, this does not influence the above-described linear approximation. In the configuration of the first embodiment, it is hardly necessary to suspend the correction process in accordance with vehicle's stopping, and so forth, and continuous correction process can be performed.

By contrast, in the case of the correction process of the second embodiment, at the time of detection of a magnetic marker after the vehicle's stop period, error E(n) is expanded in accordance with the length of that vehicle's stop period. Thus, in the case of the correction process of the second embodiment, it is required that, for example, the correction process be once suspended when the vehicle stops and error E(n) be reset in accordance with the subsequent restart of traveling to restart the correction process.

In the correction process of the first embodiment, linear approximation is performed on temporal change of error E(n). In this linear approximation, if the number of pieces of data of errors E(n) is small, linear approximation tends to become unstable. If linear approximation becomes unstable and the gradient of the approximate straight line is fluctuated, degree of influence on the correction amount is large, and there is a possibility of significantly impairing correction accuracy of measured azimuth Vs. On the other hand, in the correction process of the second embodiment in which average value AV of errors E(n) is calculated, even if the number of pieces of data of errors E(n) is small, fluctuation range of average value AV is relatively small, and thus there is a small possibility that correction accuracy becomes extremely degraded.

According to a combination of advantages of the correction process of the first embodiment and advantages of the correction process of the second embodiment, disadvantages of each correction process can be covered. For example, in the flow diagram of FIG. 11 of the first embodiment, it is preferable that the correction process of the second embodiment be performed when n is smaller than 100 (process when S311: NO in the drawing) and the correction process of the first embodiment be performed when n is 100 (process when S311: YES in the drawing).

Third Embodiment

The present embodiment is an example based on the first embodiment, with the method of estimating vehicle azimuth Vd being changed. The present embodiment is different from the first embodiment in which sensor arrays 21 are arranged at front and rear of vehicle 5 with a pitch of 2 m. And, due to this difference in arrangement of sensor arrays 21, a method of identifying vehicle azimuth Vd is different from that of the first embodiment. Details of this are described with reference to FIG. 15.

In vehicle onboard system 1 of the present embodiment, as in FIG. 15, an arrangement pitch (sensor span S) of sensor arrays 21 in vehicle 5 and an arrangement pitch (marker span M) of magnetic markers 10 match. Thus, during traveling of vehicle 5, front and rear sensor arrays 21 can almost simultaneously detect two magnetic markers 10.

In the present embodiment, vehicle azimuth Vd is calculated based on lateral shift amounts OF1 and OF2 measured by front and rear sensor arrays 21 for magnetic markers 10. Specifically, shift angle Ax of the vehicle azimuth with respect to direction dir (M) of a line segment connecting two magnetic markers 10 can be calculated as follows.

Change in lateral shift amount $OFd=|OF2-OF1|$

Shift angle $Ax=\arcsin(OFd/M)$

Direction dir(M) of an actual line segment connecting adjacent two magnetic markers 10 indicates an absolute azimuth having an error in azimuth shift due to an error in laying positions of magnetic markers 10, and this azimuth shift is indefinite. Therefore, vehicle azimuth Vd can be estimated as an azimuth shifted by shift angle Ax to the yaw direction with reference to azimuth dir (marker information), which is a design value of the direction dir(M) of the line segment.

Vehicle azimuth $Vd=\text{dir}+Ax$

In this method of estimating vehicle azimuth Vd, vehicle azimuth Vd is estimated by using lateral shift amounts (OF1, OF2) with respect to two magnetic markers 10 simultaneously detected. In this estimation method, it is not required to move vehicle 5 to obtain two types of lateral shift amounts OF1 and OF2. As a matter of course, no steering operation occurs between the time of obtaining OF1 and the time of obtaining OF2. In the method of estimating vehicle azimuth Vd in the present embodiment, a possibility of increasing estimation error in vehicle azimuth Vd due to steering operation or the like is small.

Note that configurations and operations and effects are similar to those of the first embodiment.

Reference Embodiment

This embodiment is an example based on the first embodiment or the second embodiment, with a reference azimuth for use in correcting a measured azimuth of a gyro sensor being changed. In the first and second embodiments, a vehicle azimuth estimated by using magnetic markers is set as the reference azimuth. By contrast, described in the present embodiment is a reference embodiment in which an azimuth of a traveling route of a vehicle is set as the reference azimuth.

(First Correction Process)

This correction process is targeted for a period during control of driving assist such as, for example, automatic steering, in which the vehicle is caused to travel along a lane. In this correction process, the azimuth of the traveling route is estimated based on a steering angle by driving assist control. The azimuth of the traveling route may be a relative azimuth. For example, time integration may be performed on output (angular velocity) of the gyro sensor by taking the vehicle azimuth at some point in time as an initial value to obtain the azimuth of the traveling route.

It is preferable that difference between the above-described azimuths of the traveling route and measured azimuths Vs of the gyro sensor be temporarily sequentially stored and taken as errors E(n). As for these temporal change of error E(n), approximation process may be performed as in the configuration of the first embodiment. Alternatively, as for errors E(n), an average value may be obtained as in the second embodiment. As a result of the approximation process or by using the average value, correction process similar to that in the first embodiment or the second embodiment can be performed.

(Second Correction Process)

This correction process is a process targeted for a period during control of driving assist such as automatic driving in which, for example, a vehicle is caused to travel along a predetermined route. In this correction process, it is preferable that an absolute azimuth of a road or a lane forming the predetermined route be read from map data of a three-dimensional map and that absolute azimuth be handled as an azimuth of the traveling route. And, it is preferable that a difference between this azimuth of the traveling route and measured azimuth Vs of the gyro sensor be temporarily sequentially stored and taken as errors E(n). As for errors E(n), handling similar to that in the above-described first correction process can be performed.

(Third Correction Process)

This correction process is a process in which it is assumed that a road being traveled is identified by map matching by a navigation function or the like and an azimuth of the road can be obtained by referring to map data.

For example, when a direct road such as an expressway is traveled, if a traveling lane, a passing lane, or the like is traveled without a lane change, it can be expected that an azimuth of a traveling route substantially matches the azimuth of the road. In this case, it is possible to estimate that the azimuth of the road read from the map data is an actual azimuth of the traveling route. On the other hand, during the lane change, a shift between the actual azimuth of the traveling route and the azimuth of the road is large. As a matter of course, when the azimuth of the road is assumed as the azimuth of the traveling route, this influences error E(n), which is a difference between the azimuth of the traveling route and measured azimuth Vs.

When a direct road such as an expressway is traveled, only lane changes to the right side are not repeated many times, but a possibility of a lane change to the left side after the lane change to the right side is high. With this, it can be expected that the number of times of lane changes to the right side and the number of times of lane changes to the left side are approximately equal. Also, as for influence at the time of the lane change to the right side on error E(n) and influence at the time of the lane change to the left side on error E(n), the directions of these influences are diametrically opposed, and their signs are reversed. According to the approximation process of the first embodiment and the averaging process of the second embodiment, the influence at the time of the lane change to the right side on error E(n) and the influence at the time of the lane change to the left side on error E(n) can be cancelled. Therefore, when a direct road such as an expressway is traveled, the azimuth of the road can be estimated to match the azimuth of the traveling route, irrespective of the presence or absence of the lane change.

Note that in the above-described second and third correction processes, a road or a lane where magnetic markers each including RFID tag are laid can be assumed. In this case, azimuth data indicating the azimuth of the road or the lane is preferably included in the marker information transmitted from the RFID tag. In this case, the azimuth of the road or the lane can be obtained without referring to the map data.

Note that other configurations and operations and effects are similar to those of the first embodiment or the second embodiment.

In the foregoing, specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes technologies acquired by variously modifying, changing, or combining as appropriate the above-described specific examples by using known technologies, knowledge of a person skilled in the art, and so forth.

REFERENCE SIGNS LIST

1 vehicle onboard system
10 magnetic marker

15 RFID tag (information providing part, wireless tag)
2 measuring unit
21 sensor array (magnetic detecting part)
212 detection processing circuit
22 IMU
222 acceleration sensor
223 gyro sensor
32 control unit
34 tag reader
5 vehicle
6 automatic driving system
61 vehicle ECU
65 map database (map DB)

The invention claimed is:

1. A correction method for a gyro sensor which measures angular velocity of a vehicle about an axis in a vertical direction and outputs a sensor output indicating the angular velocity, the method comprising:
   generating a measured azimuth, which is a measurement value of a turning angle of the vehicle, by temporally integrating the angular velocity indicated by the sensor output;
   a lateral shift amount detection process of detecting a lateral shift amount of the vehicle with respect to markers arranged along a traveling road of the vehicle;
   an azimuth estimation process of estimating a vehicle azimuth by obtaining a shift angle of the vehicle with respect to a line segment connecting two of the markers by using the lateral shift amount of the vehicle with respect to two of the markers arranged along the traveling road;
   a generation process of obtaining correction information based on a difference between the measured azimuth and the vehicle azimuth; and
   a correction process of correcting the angular velocity indicated by the sensor output or the measured azimuth by using the correction information.

2. The correction method for the gyro sensor in claim 1, wherein the correction information is information indicating a temporal change of the difference, and
   the correction process is a process of correcting the angular velocity indicated by the sensor output or the measured azimuth with a correction amount based on the correction information.

3. The correction method for the gyro sensor in claim 1, wherein the correction information is a temporal average value of the difference, and
   the correction process is a process of shifting the measured azimuth by a correction amount corresponding to the temporal average value of the difference.

4. A correction method for a gyro sensor which measures angular velocity of a vehicle about an axis in a vertical direction and outputs a sensor output indicating the angular velocity, the method comprising:
   a generation process of obtaining correction information based on a difference between a measured azimuth obtained by using the angular velocity indicated by the sensor output and a vehicle azimuth estimated by using markers arranged along a traveling road of the vehicle; and
   a correction process of correcting the angular velocity indicated by the sensor output or the measured azimuth by using the correction information, wherein:
   the correction information is information indicating a temporal change of the difference,
   the correction process is a process of correcting the sensor output or the measured azimuth with a correction amount based on the correction information,
   the correction information includes at least a gradient a of a straight line approximating the temporal change of the difference, and
   the correction process is a process of shifting the output from the gyro sensor by the correction amount corresponding to the gradient a.

5. The correction method for the gyro sensor in claim 4, comprising:
   a lateral shift amount detection process of detecting a lateral shift amount of the vehicle with respect to each of the markers; and
   an azimuth estimation process of estimating the vehicle azimuth based on lateral shift amounts detected by the lateral shift amount detection process for at least two of the markers.

6. The correction method for the gyro sensor in claim 5, comprising an azimuth information obtaining process of obtaining, from an information providing part provided for providing azimuth information which can identify a direction of a line segment connecting two of the markers or a direction of the traveling road, the azimuth information, wherein
   in the azimuth estimation process, the vehicle azimuth is estimated with reference to a direction identified by the azimuth information.

7. The correction method for the gyro sensor in claim 6, wherein the information providing part is a wireless tag attached to the each of the markers.

8. A correction method for a gyro sensor which measures angular velocity of a vehicle about an axis in a vertical direction and outputs a sensor output indicating the angular velocity, the method comprising:
   a generation process of obtaining correction information based on a difference between a measured azimuth obtained by using the angular velocity indicated by the sensor output and a vehicle azimuth estimated by using markers arranged along a traveling road of the vehicle; and
   a correction process of correcting the angular velocity indicated by the sensor output or the measured azimuth by using the correction information, wherein:
   the correction information is information indicating a temporal change of the difference,
   the correction process is a process of correcting the sensor output or the measured azimuth with a correction amount based on the correction information,
   the correction information includes at least a gradient a and an intercept b of a straight line approximating the temporal change of the difference, and
   the correction process is a process of shifting the measured azimuth by the correction amount obtained by multiplying a value of the gradient a by an elapsed time T from a starting point of the temporal change of the difference and adding a value of the intercept b.

9. The correction method for the gyro sensor in claim 8, comprising:
   a lateral shift amount detection process of detecting a lateral shift amount of the vehicle with respect to each of the markers; and
   an azimuth estimation process of estimating the vehicle azimuth based on lateral shift amounts detected by the lateral shift amount detection process for at least two of the markers.

10. The correction method for the gyro sensor in claim 9, comprising an azimuth information obtaining process of obtaining, from an information providing part provided for providing azimuth information which can identify a direction of a line segment connecting two of the markers or a direction of the traveling road, the azimuth information, wherein in the azimuth estimation process, the vehicle azimuth is estimated with reference to a direction identified by the azimuth information.

11. The correction method for the gyro sensor in claim 10, wherein the information providing part is a wireless tag attached to the each of the markers.

12. A correction method for a gyro sensor which measures angular velocity of a vehicle about an axis in a vertical direction and outputs a sensor output indicating the angular velocity, the method comprising:

a generation process of obtaining correction information based on a difference between a measured azimuth obtained by using the angular velocity indicated by the sensor output and a vehicle azimuth estimated by using markers arranged along a traveling road of the vehicle; and a correction process of correcting the angular velocity indicated by the sensor output by using the correction information, wherein:

the correction information is information including at least a temporal change amount of the difference, and the correction process is a process of correcting the angular velocity indicated by the sensor output by shifting the output from the gyro sensor by a correction amount corresponding to the temporal change amount.

* * * * *